June 25, 1963  H. NADLER  3,095,102

FUEL ELEMENT HANDLING MECHANISM

Filed March 28, 1960  7 Sheets-Sheet 1

INVENTOR.
HARRY NADLER

BY

ATTORNEY

INVENTOR.
HARRY NADLER
BY
ATTORNEY

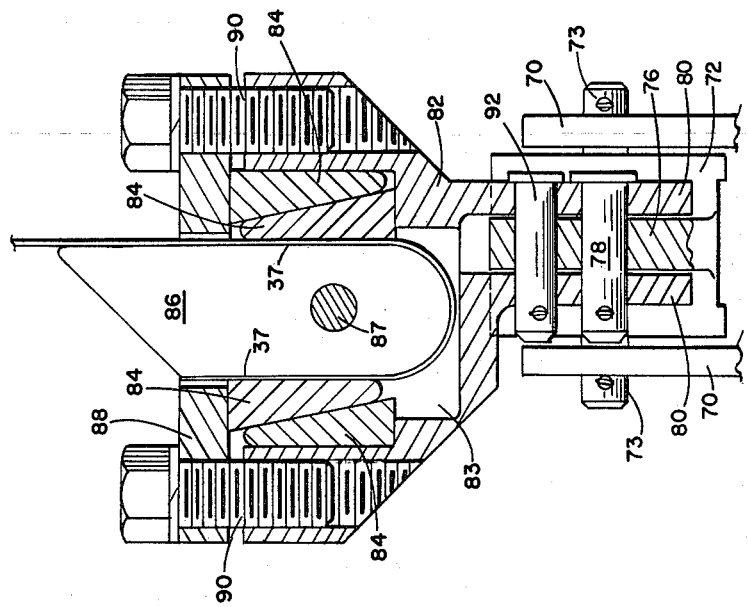
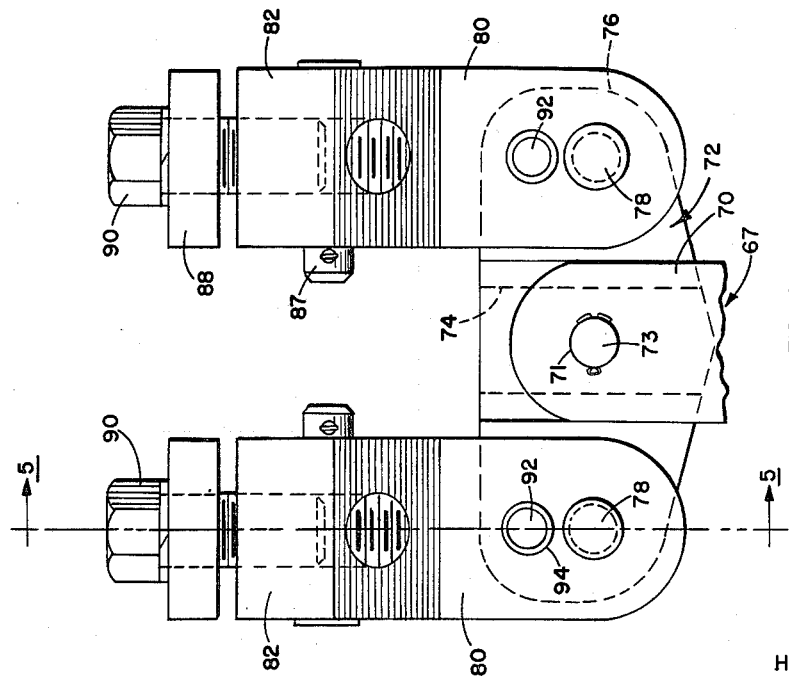

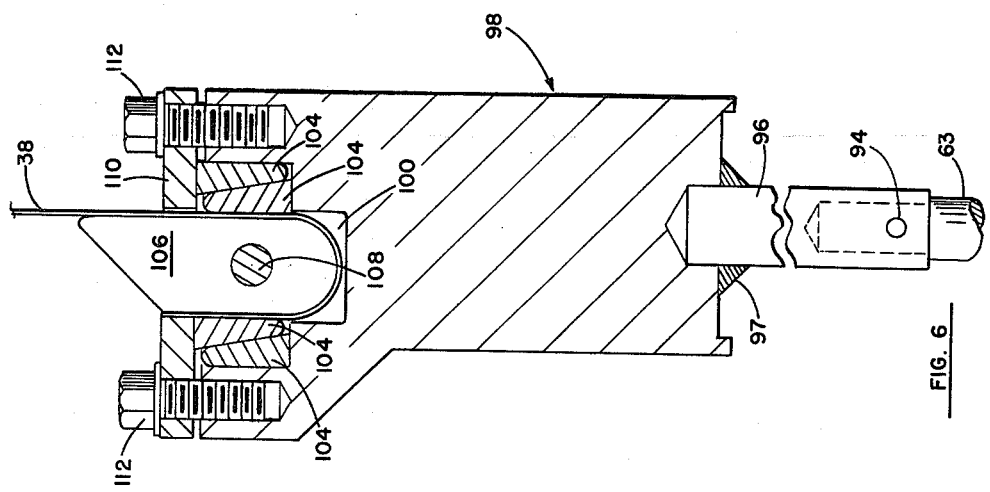
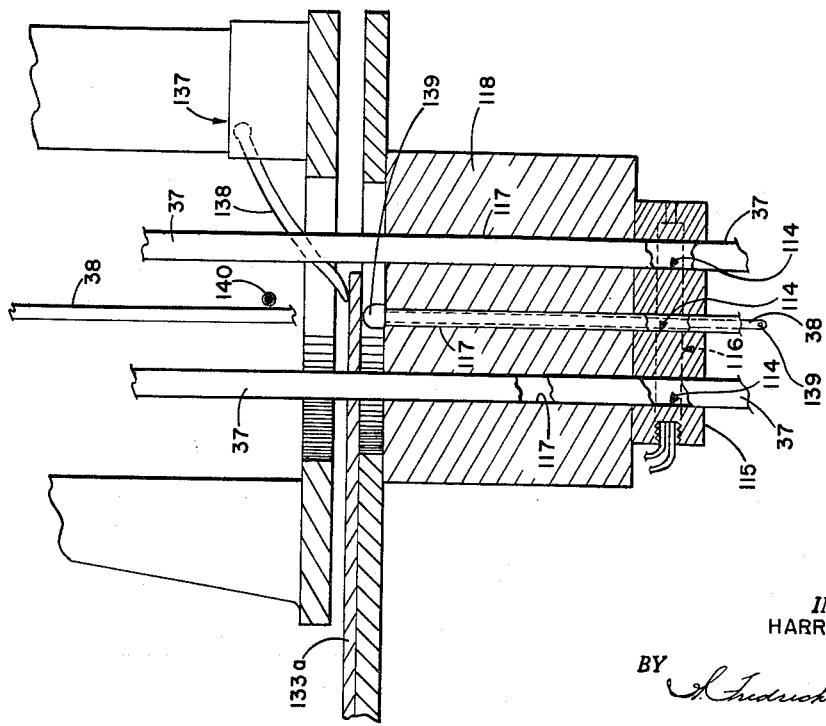

INVENTOR.
HARRY NADLER
BY
ATTORNEY

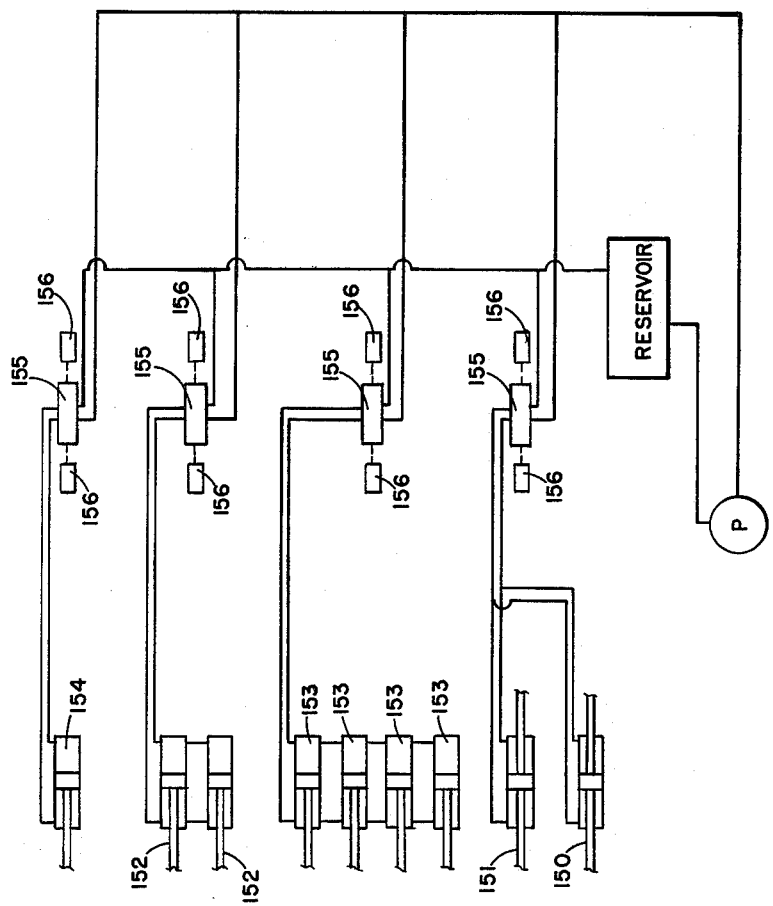

3,095,102
FUEL ELEMENT HANDLING MECHANISM
Harry Nadler, Santa Monica, Calif., assignor, by mesne assignments, to the United States of America as represented by the United States Atomic Energy Commission
Filed Mar. 28, 1960, Ser. No. 17,955
3 Claims. (Cl. 214—658)

The present invention is directed to a fuel element handling mechanism for a nuclear reactor and more particularly to a fuel element lifting grapple, grapple drive, and control mechanism.

The removal and replacement of fuel elements from the core of a nuclear reactor requires extreme care to ensure that the gripping mechanism does not jam or that the fuel element is not inadvertently dropped during the lifting or lowering. Further, misalignment of the gripping mechanism may result in jamming or injury to the fuel element.

The present invention is directed to a fuel element removal and inserting mechanism, and has as its primary object the provision of a fail-safe fuel element handling mechanism.

Another object of the present invention is to provide a fuel element handling mechanism which requires that the load be removed from the grapple before the grapple can be disengaged from the fuel element.

A further object of the present invention is to provide a fuel element handling mechanism in which the greater the load the more firmly the grapple engages the fuel element.

A still further object of the present invention is to provide a fuel element handling mechanism in which shock or vibration will not actuate the grapple to drop the load.

Another object of the present invention is to provide a grapple mechanism operated and supported by tapes thereby providing for complete visual inspection for wear of the lifting parts.

Another object of the present invention is to provide a fuel element handling mechanism which has restricted lateral movement.

Figure 1:
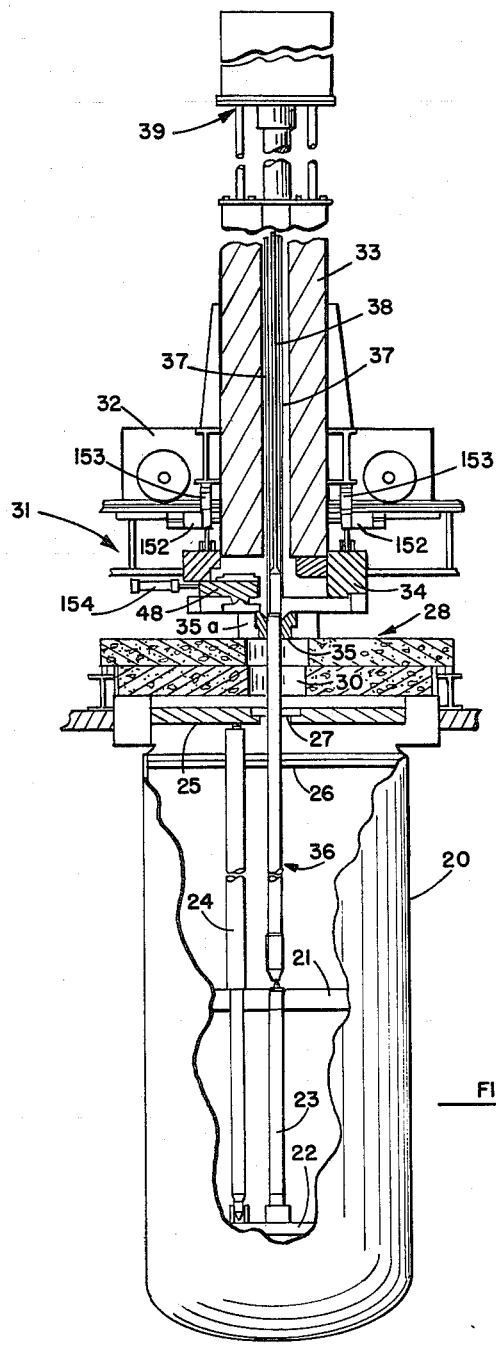
Figure 2:
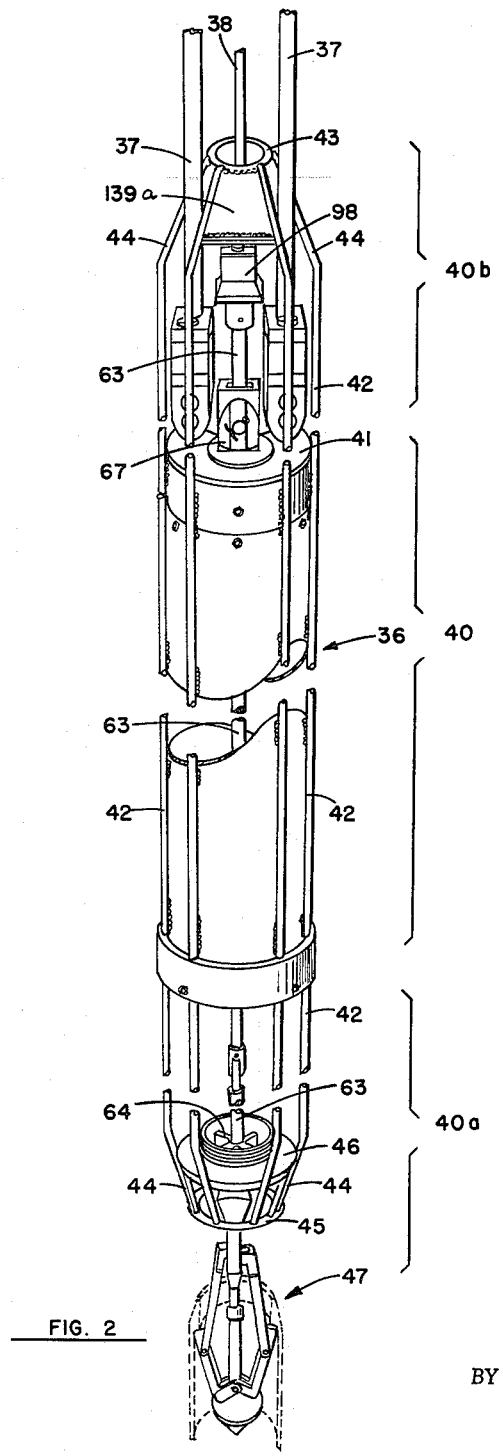
Figure 3:
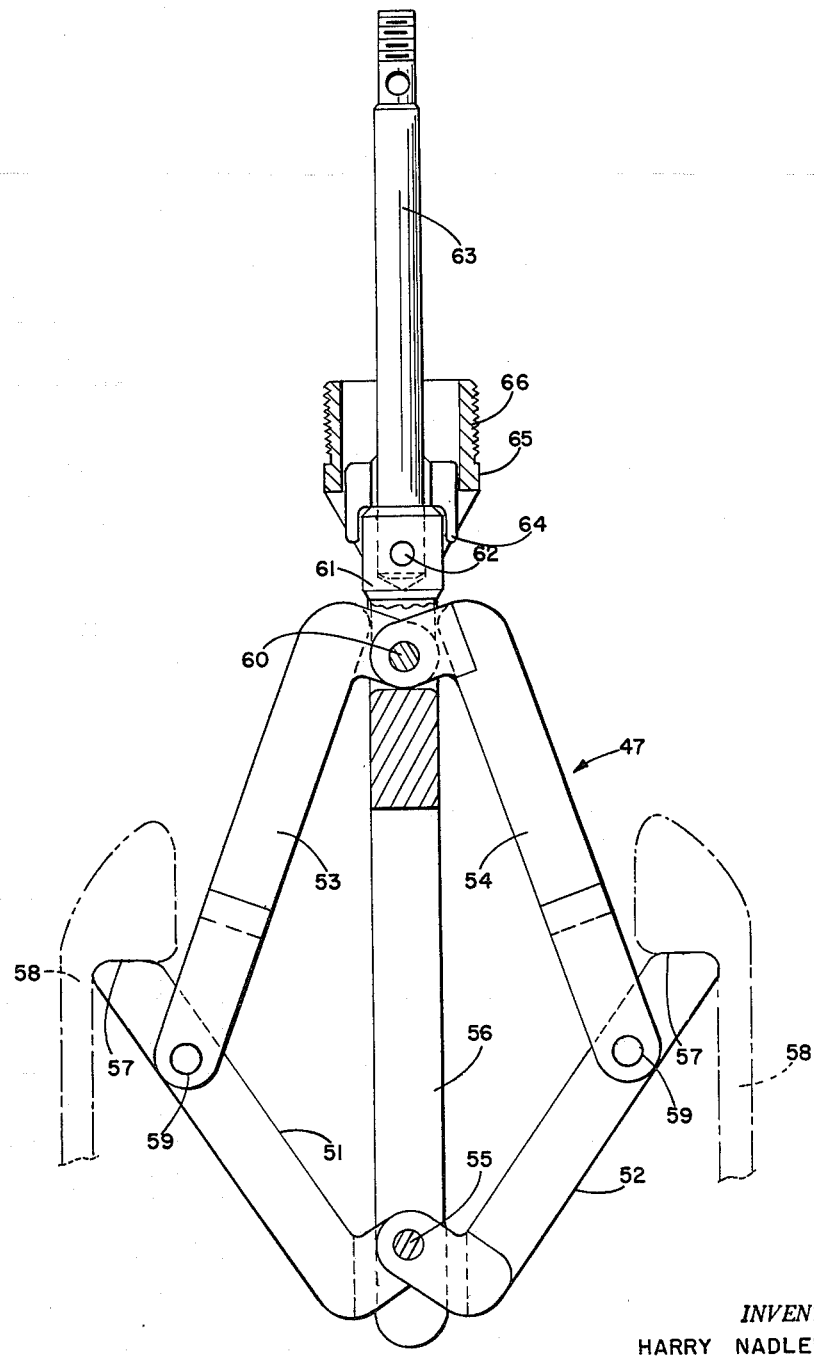
Figure 8:
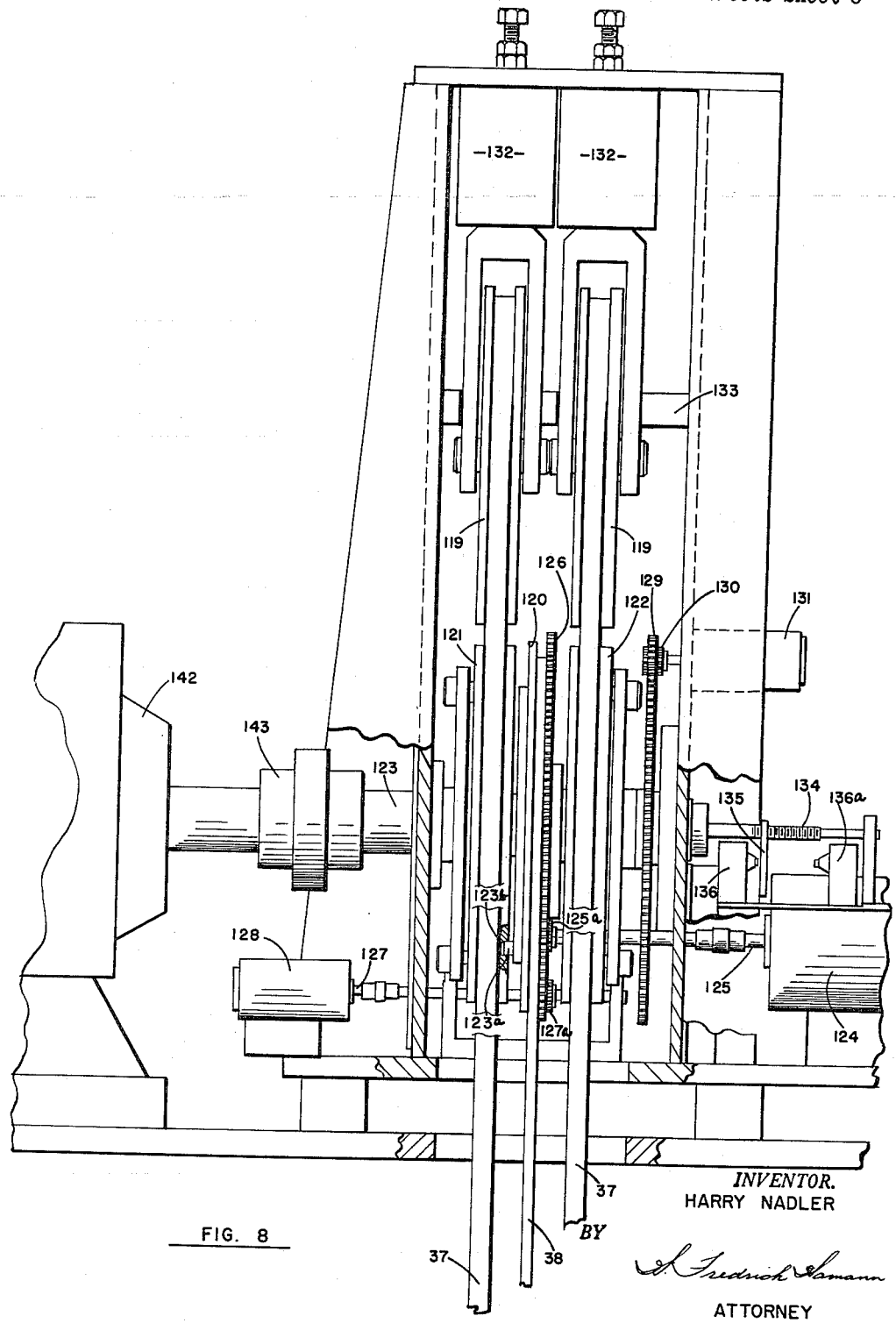

These and other objects of the present invention will be more apparent from the following detailed description and drawings, hereby made a part thereof, in which:

FIGURE 1 is a vertical sectional view of a reactor showing the relative location of the parts of the present invention, FIGURE 2 is a perspective of the grapple and linkage mechanisms, FIGURE 3 is a detailed view of the linkage mechanism, FIGURE 4 is a detailed view of the grapple support assembly, FIGURE 5 is a view along line 5—5 of FIGURE 4, FIGURE 6 is a detailed view of the control tape connector, FIGURE 7 is a sectional view of the cask top shield, FIGURE 8 is a sectional view of the hoisting and control mechanism, and FIGURE 9 is a schematic diagram of the hydraulic system of the present invention.

FIGURE 1 shows the fuel element grapple mechanism in the lowered position. Specifically a reactor core tank 20 contains a top grid plate 21 and a botom grid plate 22 supported by the tank 20 which plates support a plurality of fuel elements 23 and control elements 24 in a grid pattern. The vessel 20 is closed at its top by a top plate assembly 25 having a guide grid plate 26 and an aperture 27 through which the fuel and control elements 23 and 24 may be inserted or removed. A top shield 28 is rotatably mounted above the reactor vessel 20 and has at least one aperture 30 for core access.

Movably mounted above the top shield 28 is a gantry bridge on which a gantry trolley 32 is movably mounted. The trolley 32 supports a cask 33 into which the fuel element is loaded. The cask 33 has its lower end enclosed by a skirt 34. Inset guide 35 and guide grid plate 26 maintain the grapple 36 in alignment and minimize lateral movement of grapple 36. The grapple 36 is supported by two steel tapes 37 and a control tape 38 which are connected to the grapple drive 39. The gantry 31 carries the operator, the cask 33, the grapple drive 39 with the grapple 36. The gantry has a bridge and trolley 32. The bridge moves on floor level rails which straddle the core tank and storage cell. The gantry has an indexing pin and bushing arrangement which serves to index the gantry in a rectangular coordinate system. The index pins are hydraulically operated and slide in vertical guides, not shown, which are fastened to the bridge and trolley trucks. The trolley pin mates with bushings in a plate that is fastened to the bridge, whereas the bridge index pin mates with bushings in a plate that is fastened to the building floor. This gantry index system interlocks with the cask bottom shield 48. With this arrangement, the cask cannot be moved until the cask bottom shield 48 is closed; in addition, the cask bottom shield 48 cannot be opened or closed unless the index pins are fully inserted into the index bushings. See FIGURE 9 and associated description.

The cask 33 supports the grapple drive 39, seals liquids and vapors inside the cask enclosure, provides a cooling system for a hot fuel element, and is designed to provide biological shielding. It consists primarily of the body 33, movable skirt 34, and cask bottom seal 48. The movable skirt 34 serves as a radiation shield between the cask 33 and movable shield 35a. Four equally spaced hydraulic cylinders raise or lower the skirt 34. In the down position, a rubber tube fastened to the lower surface of the skirt 34 effects a vapor seal with the top surface of movable shield 35a.

The grapple 36 is shown in detail in FIGURE 2 and comprises three separable parts, a center cylindrical section 40 which may have different lengths to accommodate different rods, a bottom section 40a which is removably connected to section 40 by pins, and top section 40b also removably connected to section 40 by pins and having a plate 41 to which the load equalizing mechanism is attached. The upper and lower sections 40b and 40a consist of cages formed by rods 42 which have extensions along the surface of the center portion 40. The rods 42 of the upper and lower sections have inwardly extending portions 44 which are connected to rings 43 and 45, respectively. The conical surfaces formed by the portions 44 at the ends of the grapple serve to guide the grapple 36 through guides 26 and 35.

The fuel element engaging link mechanism 47 is shown in detail in FIGURE 3 and consists of a four bar linkage with links 51, 52, 53, and 54. Links 51 and 52 have yoked ends which are pivotally connected by pin 55 to yoke 56 and have fuel element engaging surfaces 57 at the other end. The fuel element is shown in phantom at 58. Spaced from the engaging surfaces 57 are pivots 59 through which the lower yoked ends of links 53 and 54 are pivotally connected to links 51 and 52, respectively. Links 51 and 52 may have forked ends so that a plurality of engaging surface is available to prevent wobble of the fuel element on the link mechanism 47. Links 53 and 54 are pivotally connected at their upper ends by pivot pin 60 which is supported by clevis 61. Clevis 61 is vertically movable within the upper yoke portion of yoke 56 and is the means by which the links are spread or collapsed. Clevis 61 is attached by a pin 62 to a rod 63. Rod 63 has an attached guide 64 which is vertically slidable within the guide portion 65 of yoke 56. The guide portion 65 has a thread 66 which connects to adapter 46 (see FIGURE 2).

The adapter 46 is welded to rods 44 so that yoke 56 is maintained rigid with respect to rods 42 and 44.

The rods 42 and 44 form a cage within which the grapple actuating and support connections are contained. The grapple actuating and support connections are located above the plate 41, which has attached to its upper surface a connector 67 to which the lifting tapes 37 are connected and through which the rod 63 is freely movable.

The lifting tapes are connected to connector 67 by the mechanism shown in FIGURE 4.

The connector 67 has an upwardly extending yoke portion 70 to which is pivotally attached at 71 a bracket 72 having a central aperture 74 by means of two pins 73 which do not extend across the aperture 74. The rod 63 is freely movable through aperture 74. Bracket 72 has web end portions 76 to which are pivotally attached by pins 78 the lower yoke end portion 80 of a housing 82.

The housing 82 (see FIGURE 5) has a central aperture 83 in which wedges 84 hold a steel lifting tape 37 against a clamp 86. The clamp is pivotally attached at 87 to the housing 82 and the wedges 84 are forced into contact with the clamp 86 and housing 82 by a cover plate 88 held in fixed relation with the housing 82 by bolts 90. Two lifting tapes 37 are utilized and are held with a common plane passing through the center line of the mechanism. In order to allow limited movement of the housing 82 so that the lifting force is evenly distributed between the two tapes 37, pins 92 are provided which are movable within a slot 94 in the web 76 of bracket 72.

The rod 63 is connected by a pin 94 (see FIGURE 6) to an adapter rod 96 which is welded at 97 to a body element 98 having a recess 100 in its upper portion. A control tape 38 is connected, by wedges 104 and a clamp 106, the latter being pivotally connected at 108, to the body element 98. A cover plate 110 held by bolts 112 maintains the wedges 104, clamp 106, and tape 38 in fixed relation. The tape 38 lies within a plane formed by and symmetrically located with respect to, the center line of rod 63. The body element 98 is sized so that its weight will force rod 63 down and open the linkage 47 when no upward force is present on tape 38.

The tapes 37 and tape 38 extend upwardly to a control and hoisting mechanism or grapple drive which winds and unwinds the two hoisting tapes 37 and the release or control tape 38. While three parallel tapes have been shown, two or more may be used, and the configurations may be as desired, e.g., a radial array of three tapes could be used. These tapes pass through polished close-fitting heated slots 114 in a block 115 fastened to the cask top shield (see FIGURE 7). The block 115 contains a heater 116. The tapes also pass through larger slots 117 in the cask top shield 118.

Hoisting tapes 37 pass over idler pulleys 119 (see FIGURE 8) and then wind up on pulleys or drums 121 and 122, while release or control tape 38 winds up on pulley or drum 120. The tapes are gripped in pulleys 120, 121, and 122 by means of wedges, not shown.

Pulleys 121 and 122 are keyed to drive shaft 123 while pulley 120 rotates freely on drive shaft 123. Lost motion is provided by a pin 123a in pulley 120 that moves in a grooved sector 123b in pulley 121 and serves to limit the degree of relative rotation between pulleys 121 and 122, and pulley 120. The relative rotation between pulleys 121 and 122, and 120 is about 15 degrees and serves to open and close the grapple linkage. A torque motor 124 rotates pulley 120 through shaft 125 which carries a gear 125a to mesh with gear 126. Gear 126 also meshes with a gear 127a on shaft 127 which connects to the transmitter synchro 128. Synchro 128 connects electrically with a differential synchro, which is located on the control console panel and indicates whether the grapple linkage is open or closed. Gear 129 keyed to shaft 123 meshes with gear 130 that drives transmitter synchro 131. Synchro 131 connects electrically to a receiver synchro and the forementioned differential synchro, both located on the control console. The receiver synchro drives a digital counter, which shows the grapple elevation.

It is apparent that with the pin 123a and grooved sector 123b connection between drum 120 and drum 121, when the torque motor 124 is de-energized, drum 120 is rotated through the sector, by the weight of element 98, and the tape 38 will be allowed to move downwardly and allow the linkage 47 to expand. This rotation of drum 120 preferably brings the pin 123a into contact with the end of sector 123b so that the rotation of drum 121 is in the direction to maintain the pin in contact with the end of the sector. Thus the force transmitted through drum 121 to drum 120 and tape 38 forces surfaces 57 of the linkage against the fuel element 58. The linkage can not be collapsed with a fuel element on the grapple because the weight of the fuel element tends to open the linkage rather than close it. The torque motor 124 is incapable of exerting sufficient force to close the linkage when the fuel element is supported by the grapple. In this manner the fuel element can not be dropped when the fuel element weight is supported by the grapple. It is only after the load is removed that the linkage 47 can be collapsed by the force exerted by torque motor 124. Thus the greater the load the more firmly the linkage of the grapple engages the fuel element.

Load cells 132 support the idler pulleys 119 and transmit tape-load information to meter read outs. The meters also operate controllers which shut off the hoisting motor at low and high speeds. Guide plates 133 restrict the idler pulley yoke to vertical motion.

The shaft 123 is driven by the hoisting motor, not shown, through a speed reducer and has at one end thereof a lead screw 134 and nut 135 to actuate a microswitch 136, the grapple down-limit control. Another microswitch 136a could be used for up-limit control. Microswitch 137, the up-limit control, connects to lever arm 138. A cantilever spring 133a between arm 138 and rod 139 provides a bearing surface for arm 138 and also helps return rod 139 to the down position. Rod 139 contacts a plate 139a on the top section of the grapple (see FIGURE 2) with the cask top shield serving as a bearing for rod 139. If the grapple release tape 38 breaks or moves away from lever arm 140, a microswitch, not shown, shuts off the drive motor. Drive shaft 123 connects to a self locking double input shaft speed reducer 142 through a coupling 143. A removable hand crank, not shown, fits one end of the input shaft; the other end connects through a torque-limiting coupling to a right-angled speed reducer which is connected to a variable speed motor.

The hydraulic system, shown schematically in FIGURE 9, serves to move the gantry index pins, the cask skirt 34, and the cask bottom seal 48. By means of an interlocking control system, the hydraulic actuated members are moved in an ordered sequence. In addition, the interlocks serve to prevent (1) the closing of the cask bottom seal until the fuel element is completely inside the cask; (2) moving the handling machine until the cask is sealed; and (3) opening the cask bottom seal unless the handling machine is in position where the index pins can be inserted. In order to open the cask bottom shield 48, the grapple 36 must be fully up, then in sequence the index pins 150 and 151 are inserted into the index bushings for the bridge and trolley, the cask skirt lock pins 152 are retracted; the skirt is lowered by hydraulic cylinders 153, and finally the cask bottom seal is opened. To close the cask bottom seal 48 and move the handling machine to another position, the grapple 36 must be fully up, then in sequence the cask bottom seal 48 is closed, the skirt 34 is raised, the skirt lock pins 152 are inserted and finally the index pins 150 and 151 are retracted. Cylinders 153 and 154 and pins 150, 151, and 152 are actuated through valves 155 operated by solenoids 156.

The electrical system, not shown, insures fail-safe operation, visual information relating to handling system operation and simple control. This is accomplished by an interlock system which requires that the hydraulic system be operated in sequence, visual indication of the terminal positions for the hydraulic cylinder pistons and grapple, tape breakage, and hoisting tape loads, visual read-outs showing grapple elevation, and whether the grapple is opened or closed.

Although a particular embodiment of the present invention has been descrbed, various modifications will be apparent to those skilled in the art, e.g., angular orientation, where required, may be accomplished using rods 42 or similar means as guides. Therefore, the present invention is not limited to the specific embodiment disclosed but only by the appended claims.

What is claimed is:

1. A device for handling a vertically disposed rod comprising:
   (a) grapple means having a radially inwardly extending end portion;
   (b) linkage means connected to said grapple end portion and movable about a pivot point on said end;
   (c) first and second drums;
   (d) means mounting said first and second drums for rotation about a common shaft so that only said second drum rotates freely about said shaft;
   (e) tape means for supporting said grapple means along a longitudinal axis having a first tape connecting said grapple means to said first drum and further having a second tape connecting said linkage means to said second drum;
   (f) a first drive means for rotating said first and second drums;
   (g) a lost motion means between said first and second drums;
   (h) said lost motion means including an arcuate slot of predetermined length in said first drum and a pin extending from said second drum slidable in said slot;
   (i) a bias means connected to said second tape for rotation of said second drum relative to said first drum and limited by said lost motion means;
   (j) a second drive means for contrarotation of said second drum relative to said first drum and limited by said lost motion means; and
   (k) said limited arcuate rotation and contrarotation moving said second tape to move said linkage means about said pivot point in a direction lateral to said longitudinal axis.

2. A device for handling a vertically disposed rod comprising:
   (a) grapple means having a radially inwardly extending end portion;
   (b) linkage means connected to said grapple end portion and movable about a pivot point on said end;
   (c) first and second drums;
   (d) means mounting said first and second drums for rotation about a common shaft so that only said second drum rotates freely about said shaft;
   (e) tape means for supporting said grapple means along a longitudinal axis having a first tape connecting said grapple means to said first drum and further having a second tape connecting said linkage means to said second drum;
   (f) a first drive means for rotating said first and second drums;
   (g) a lost motion means for positively interconnecting said first and second drums;
   (h) said lost motion means including an arcuate slot of predetermined length in said first drum and a pin extending from said second drum slidable in said slot;
   (i) a weighted element connected to said second tape for rotation of said second drum relative to said first drum and limited by said lost motion means;
   (j) a second drive means operable only when said linkage means is disengaged from the rod for contrarotation of said second drum relative to said first drum and limited by said lost motion means; and
   (k) said limited arcuate rotation and contrarotation moving said second tape to expand and collapse said linkage means about said pivot point in a direction lateral to said longitudinal axis.

3. A device for handling a vertically disposed rod comprising:
   (a) grapple means having a radially inwardly extending end portion;
   (b) linkage means connected to said grapple end portion and movable about a pivot point on said end;
   (c) first and second drums;
   (d) means mounting said first and second drums for rotation about a common shaft so that only said second drum rotates freely about said shaft;
   (e) tape means for supporting said grapple means along a longitudinal axis having a first tape connecting said grapple means to said first drum and further having a second tape connecting said linkage means to said second drum;
   (f) said second tape coinciding with said axis in a generally parallel relationship to said first tape;
   (g) a first drive means for rotating said first and second drums;
   (h) a lost motion means for positively interconnecting said first and second drums;
   (i) said lost motion means including an arcuate slot of predetermined length in said first drum and a pin extending from said second drum slidable in said slot;
   (j) a weighted element connected to said second tape for rotation of said second drum relative to said first drum and limited by said lost motion means;
   (k) a second drive means operable only when said linkage means is disengaged from the rod for contrarotation of said second drum relative to said first drum and limited by said lost motion means;
   (l) said limited arcuate rotation moving said second tape to expand said linkage means about said pivot point in a direction normal to said longitudinal axis;
   (m) said limited arcuate contrarotation moving said second tape to collapse said linkage means about said pivot point in a direction normal to said longitudinal axis; and
   (n) means to limit movement of said grapple means along said longitudinal axis.

References Cited in the file of this patent

UNITED STATES PATENTS

| | | |
|---|---|---|
| 846,837 | Evans | Mar. 12, 1907 |
| 848,287 | Browning | Mar. 26, 1907 |
| 1,282,479 | Smith | Oct. 22, 1918 |
| 2,169,316 | Zwald | Aug. 15, 1939 |
| 2,670,233 | Barchoff | Feb. 23, 1954 |